G. SMITH.
Wheel Cultivator.
No. 27,654.
Patented Mar. 27, 1860.
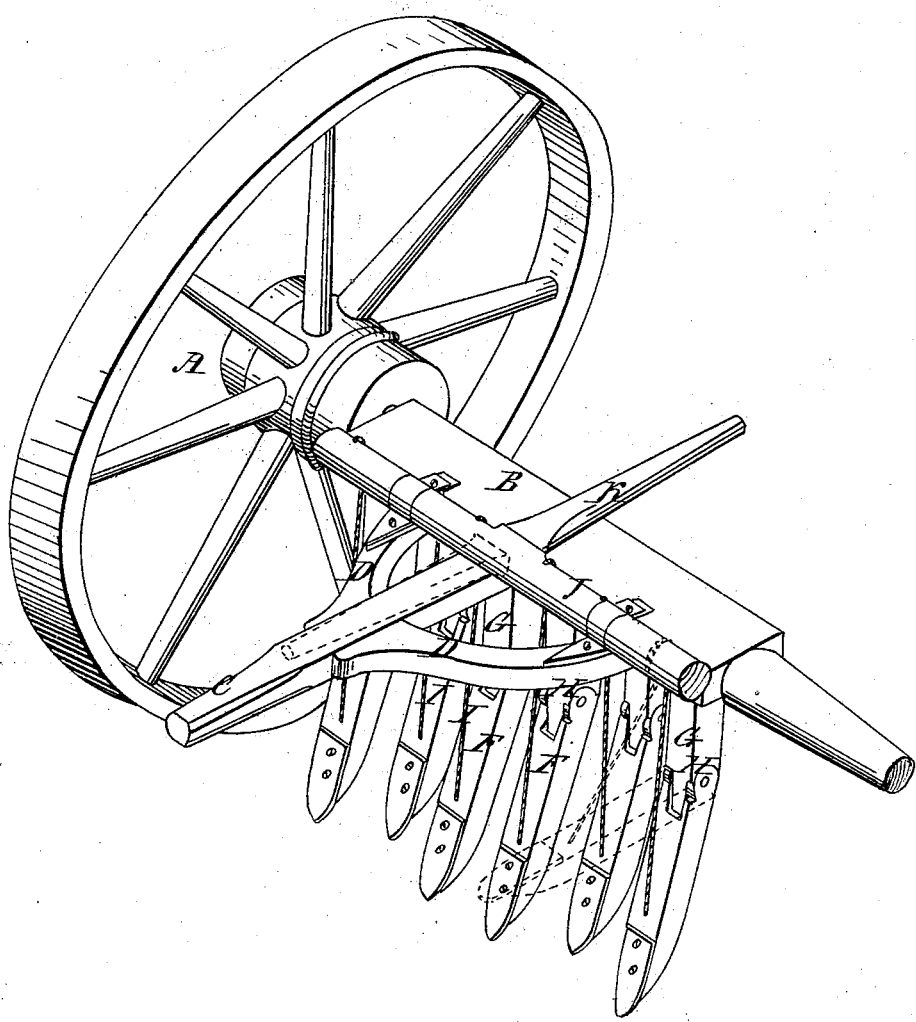

UNITED STATES PATENT OFFICE.

GEORGE SMITH, OF BALTIMORE, OHIO.

IMPROVEMENT IN CULTIVATORS.

Specification forming part of Letters Patent No. 27,654, dated March 27, 1860.

*To all whom it may concern:*

Be it known that I, GEORGE SMITH, of Baltimore, in the county of Fairfield and State of Ohio, have invented certain new and useful Improvements in Cultivators; and I do hereby declare that the same are described and represented in the following specifications and drawing.

To enable others skilled in the art to make and use my improvements, I will proceed to describe their construction and operation, referring to the drawings.

The nature of my invention consists in the construction and arrangement hereinafter described.

In the accompanying drawing, A is one of the wheels (the other being omitted) which support and carry the axle B, upon which the wheels are fitted to turn freely. The axle B is provided with a tongue or pole, C, supported by the hounds D D, as shown in the drawing. To the tongue or pole C the animals which are to draw the machine may be hitched or harnessed in some convenient manner. F F are teeth, which may be made in the form shown or in such other as will answer the purpose, and connected to the shanks G G by a hinge-joint at H H, so that they will vibrate forward from a perpendicular, but not backward, as the hinge is so constructed as to allow the tooth to come back straight or parallel with the shank G, but no farther.

The shanks G G, to which the teeth are hinged, are firmly fastened in the axle B, and the second shank from each end is set a little farther back in the axle than the others, so that the teeth are not in a line, but part are set farther forward than the others.

The chains or ropes I I are fastened to the front side of the teeth F F, and also to the roller J, which is arranged to turn in brackets fastened to the axle B and to the hounds D D, and has the lever K fastened in it, so that by raising the lever and winding up the ropes they raise the points of the teeth. This may be done to raise the teeth so as to pass over stones, stumps, or other obstructions, or to make the teeth work at a less depth in the ground being cultivated; and a rope may be fastened to the lever K and to the tongue to hold the lever in the position required to hold the teeth at the height desired.

A seat may be arranged on the axle for a boy to drive the horses, so as to cultivate two rows of corn or other crops at once, and thus do more and do it better in less time and with less manual labor than with any other cultivator in my knowledge; and by raising the teeth the machine may be turned at the ends of the rows without disturbing the crops; and by raising part of the teeth the others may be used to mark off land for corn, potatoes, or other crops.

I believe I have described and represented my improvements in cultivators so as to enable any person skilled in the art to make and use them. I will now state what I desire to secure by Letters Patent, to wit:

The arrangement of the hinged teeth F, shanks G, ropes or chains I, roller J, and lever K, the whole being arranged for joint operation as described, for the purposes set forth.

GEORGE SMITH.

Witnesses:
   JOSEPH POFF,
   HENRY G. BLACK.